(12) United States Patent
Henrick

(10) Patent No.: US 6,628,940 B1
(45) Date of Patent: Sep. 30, 2003

(54) WIRELESS PORTABLE INFORMATION STORAGE AND RETRIEVAL DEVICE

(75) Inventor: Robert F. Henrick, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/314,796

(22) Filed: May 18, 1999

Related U.S. Application Data

(63) Continuation of application No. 08/688,916, filed on Jul. 31, 1996, now Pat. No. 5,940,752.

(51) Int. Cl.⁷ .............................................. H04M 11/00
(52) U.S. Cl. ...................................... 455/419; 455/426
(58) Field of Search ................................. 455/419, 426, 455/418, 420

(56) References Cited

U.S. PATENT DOCUMENTS

| | | | |
|---|---|---|---|
| 4,969,136 A | | 11/1990 | Chamberlin et al. .......... 369/29 |
| 4,975,896 A | | 12/1990 | D'Agosto, III et al. ....... 369/29 |
| 5,127,040 A | * | 6/1992 | D'Avello et al. ............ 455/419 |
| 5,276,729 A | * | 1/1994 | Higuchi et al. ............... 379/58 |
| 5,297,191 A | | 3/1994 | Gersberg .................... 455/419 |
| 5,479,480 A | * | 12/1995 | Scott ........................... 379/59 |
| 5,570,367 A | | 10/1996 | Ayanoglu et al. ........... 370/346 |
| 5,603,084 A | | 2/1997 | Henry, Jr. et al. .......... 455/419 |
| 5,742,905 A | * | 4/1998 | Pepe et al. ................... 455/461 |
| 5,748,895 A | * | 5/1998 | Shiff et al. .................. 713/100 |
| 5,764,731 A | * | 6/1998 | Yablon ..................... 379/88.15 |
| 5,911,485 A | | 6/1999 | Rossmann .................... 341/22 |
| 5,920,826 A | | 7/1999 | Metso et al. ................ 455/557 |
| 5,930,703 A | | 7/1999 | Cairns ........................ 455/418 |
| 5,933,478 A | * | 8/1999 | Ozaki et al. ............. 379/93.24 |

FOREIGN PATENT DOCUMENTS

CA 2045057 1/1992

\* cited by examiner

*Primary Examiner*—Daniel Albebe

(57) ABSTRACT

In a cellular telephone terminal having increased storage capability, ease of entry and access for data stored therein is provided through utilization of a computer equipped with a modem, a wired telephone network and the cellular telephone network. A user utilizes the ease of data entry implicit to modern computers through dedicated or existing personal information organizers to input data into a database, such as a personal dialing directory, at the computer. For the entering of data at the cellular telephone terminal, first the terminal, also equipped with a modem, is configured in a data download mode where data can be received from the computer and entered into on-board storage. The computer then places a modem telephone call to the terminal, either directly or through a network translator, and transfers the data into the terminal. The data is then accessible through standard data recall techniques using a display and interface keys on the telephone terminal.

31 Claims, 4 Drawing Sheets

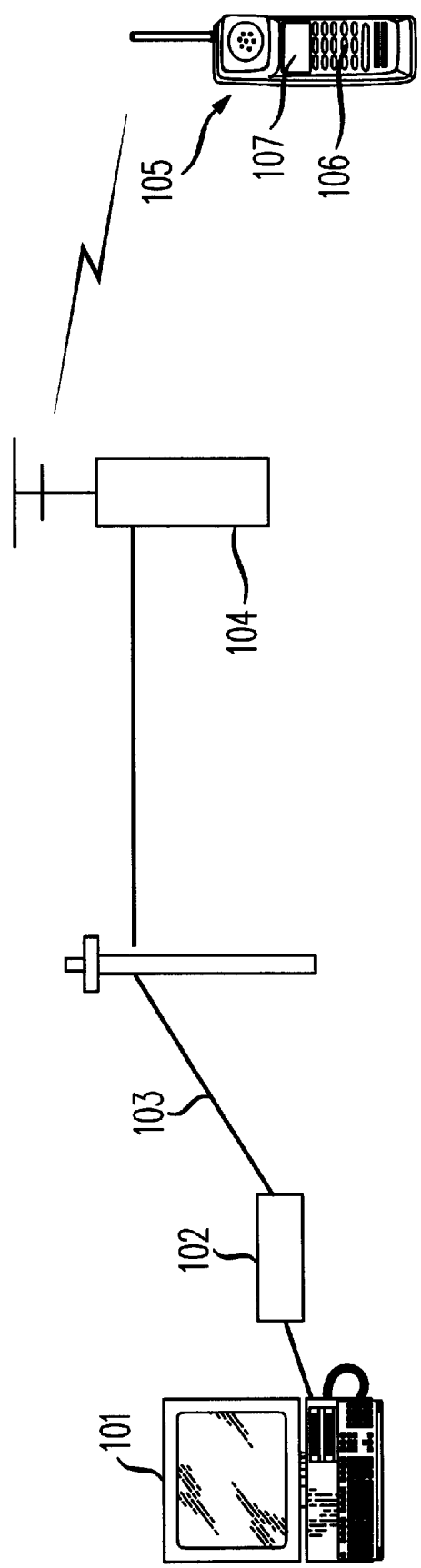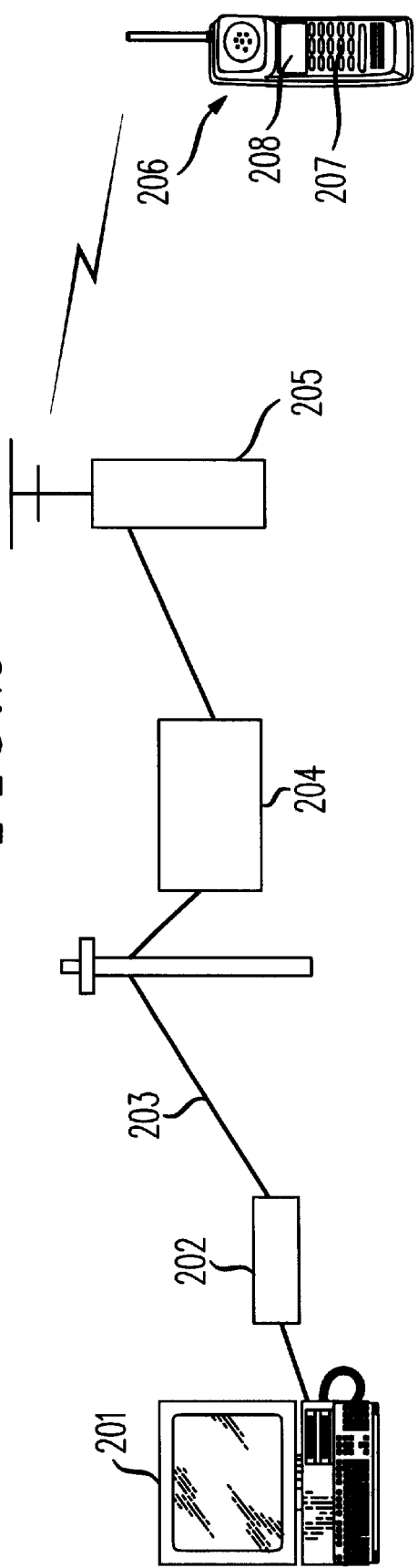

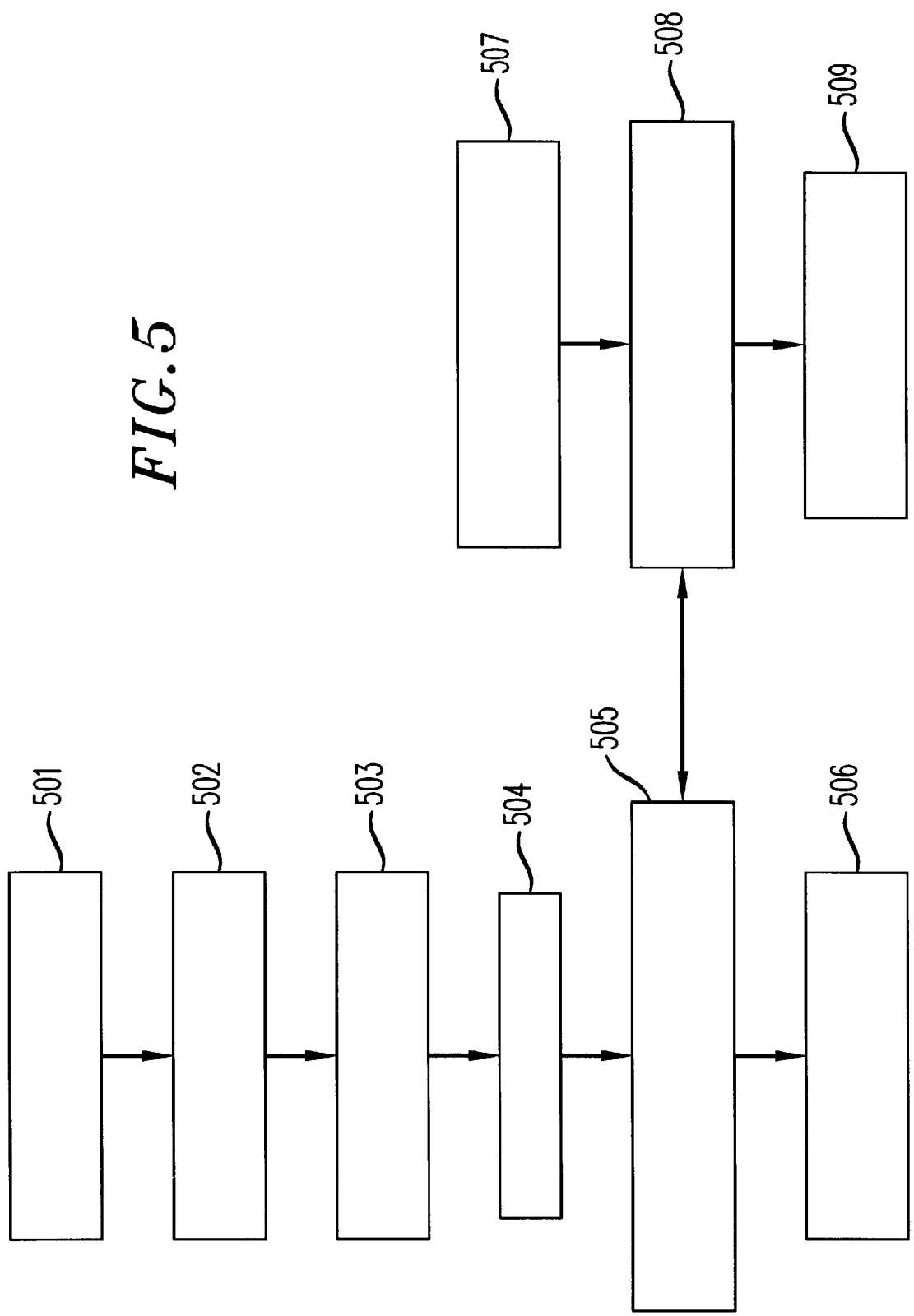

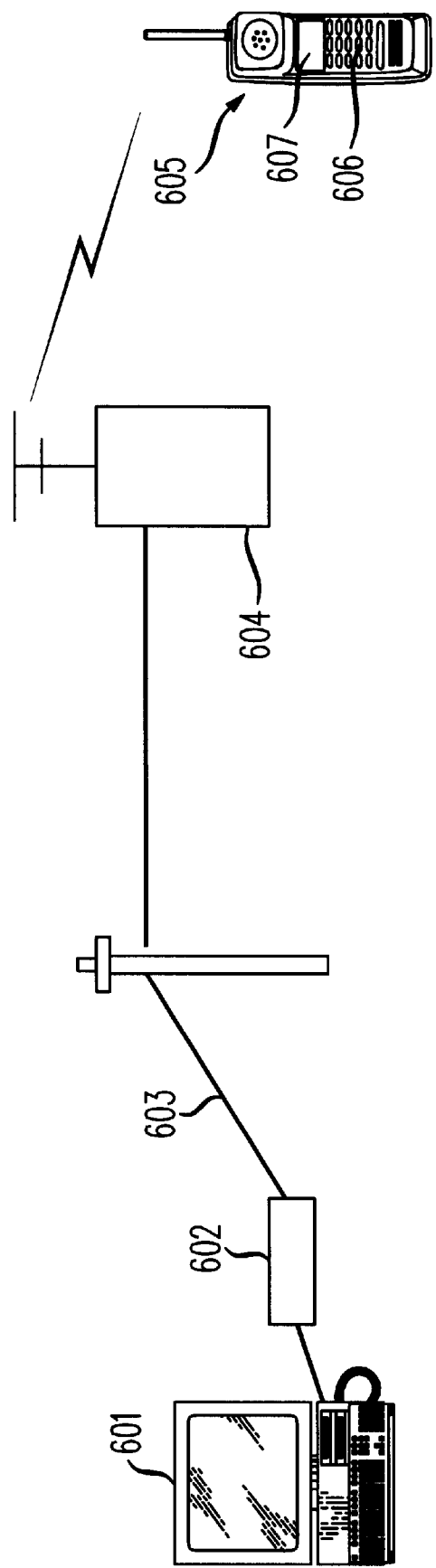

WIRELESS PORTABLE INFORMATION STORAGE AND RETRIEVAL DEVICE

This application is a continuation of U.S. application Ser. No. 08/688,916 filed on Jul. 31, 1996, now U.S. Pat. No. 5,940,752.

FIELD OF THE INVENTION

The invention relates to enhancements in cellular telephone terminal automatic recall and dialing capabilities in addition to enhancements in personal organizer software used in computer telecommunications applications.

BACKGROUND OF THE INVENTION

Cellular telephones are becoming ubiquitous accessories in our mobile society and provide opportunities to remain in communication away from principal work and residence locations. Complexity of modern life has led to cellular telephones with extensive stored directories, so that what was once carried in a personalized telephone book is now stored in the digital memory of a cellular telephone terminal, with multiple voice, fax computer and pager numbers often being associated with a single person.

The increasing ability of manufacturers to move to smaller and more integrated components and packaging, as well as consumer demand for portability has led to decreased size and weight with each generation of cellular telephone terminals. Moreover, reduced display costs and power consumption are allowing manufacturers to put higher resolution displays in cellular telephone terminals with more information display capability. In addition to displaying personal telephone directories, these displays have become capable of displaying other information such as reminders, anniversaries or appointments, and the like. The decreased size and increased storage of information requirements conflict from a user interface standpoint, however. Entering a lengthy directory with possible subdirectory structures using a standard cellular dialing pad is an onerous task.

At the same time, there has been a remarkable growth in desktop and mobile personal computers used for the organization and storage of information. Personal organizer software supports extensive storage of telephone directories as well as other information necessary for many individuals. This software focuses on the ease of inputting data through specialized graphical user interfaces and integration with other telecommunications applications. Further, computer telephony integration has motivated the creation and maintenance of computer telephone directories with an ease of updating these directories through keyboards, cursor control devices and graphical user interface input features which do not exist on cellular telephone terminals.

Accordingly, there is a great contrast between entering and maintaining information on a personal computer with a large screen, keyboard, mouse and database interfaces and entering and maintaining information on a cellular telephone terminal having a small display and reduced size dialpad. The end result has been that little information beyond telephone information is stored in a telephone terminal Further, due to the difficulty in inputting telephone terminal data, the synchronization of the telephone terminal directories with those in personal computer databases is a continual problem since it is rare for a user to keep the telephone terminal current by regularly adding and deleting names and numbers in the telephone terminal.

It is known from the prior art that telephone sets and similar apparatuses may be remotely programmed. Examples of such remote programming operations are provided in U.S. Pat. Nos. 4,788,720, 5,297,191 and 5,297,192. Such operations do not address the need to personally configure and frequently update user information available at a telephone terminal, however. It is now technically feasible and desirable to provide a cellular telephone terminal that allows increased storage of information therein while providing ease of input and maintenance of the information.

SUMMARY OF THE INVENTION

The prior art problem is solved in accordance with the present invention by providing a user of a cellular telephone terminal with a remotely programmable capability wherein the ease of data entry and organization provided by personal computer input devices and telecommunications applications are combined with the general utility of a portable cellular telephone terminal.

In accordance with a first aspect of the invention, the cellular telephone terminal serves as a portable information storage and retrieval device for data stored in and transmitted to the terminal from the personal computer. The computer and associated input devices and screens, local and network databases and interfaces to personal organizer software all allow ease of input and maintenance of the information. A communications path between the personal computer and the telephone terminal is advantageously provided for periodically transferring the information from the personal computer to the telephone terminal. The cellular telephone terminal is thus provided access to information such as a dialing directory, appointments, reminders, etc. that is easily inputted and conveniently stored in the terminal.

In accordance with a second aspect of the invention, a network platform communicates with the computer via an analog modem and with a digital cellular telephone via a digital modem while providing a translation between these two systems and exploiting an existing wired and wireless network telecommunication infrastructure. Use of the existing infrastructure has the benefit of permitting a rapid exchange of information using standard and existing protocols. Undesired information and interference from third parties through the cellular network is avoided by requiring the user to configure the cellular terminal into a data download mode and also allowing the user to control the information and time of the download from the personal computer to the telephone terminal.

BRIEF DESCRIPTION OF THE DRAWINGS

This invention and its mode of operation will be more clearly understood from the following detailed description when read with the appended drawings in which:

FIG. 1 shows a telecommunications infrastructure in which a telephone terminal is configured with data from a computer, in a first operational embodiment, in accordance with the invention;

FIG. 2 shows a telecommunications infrastructure in which a telephone terminal is configured with data from a computer, in a second operational embodiment, in accordance with the invention;

FIG. 5 shows a flow diagram of an operational sequence for downloading information into the remotely programmable cellular telephone terminal; and FIG. 6 shows a telecommunications infrastructure in which a telephone terminal is configured with data from a computer, in a third operational embodiment, in accordance with the invention.

DETAILED DESCRIPTION

Figure 3:
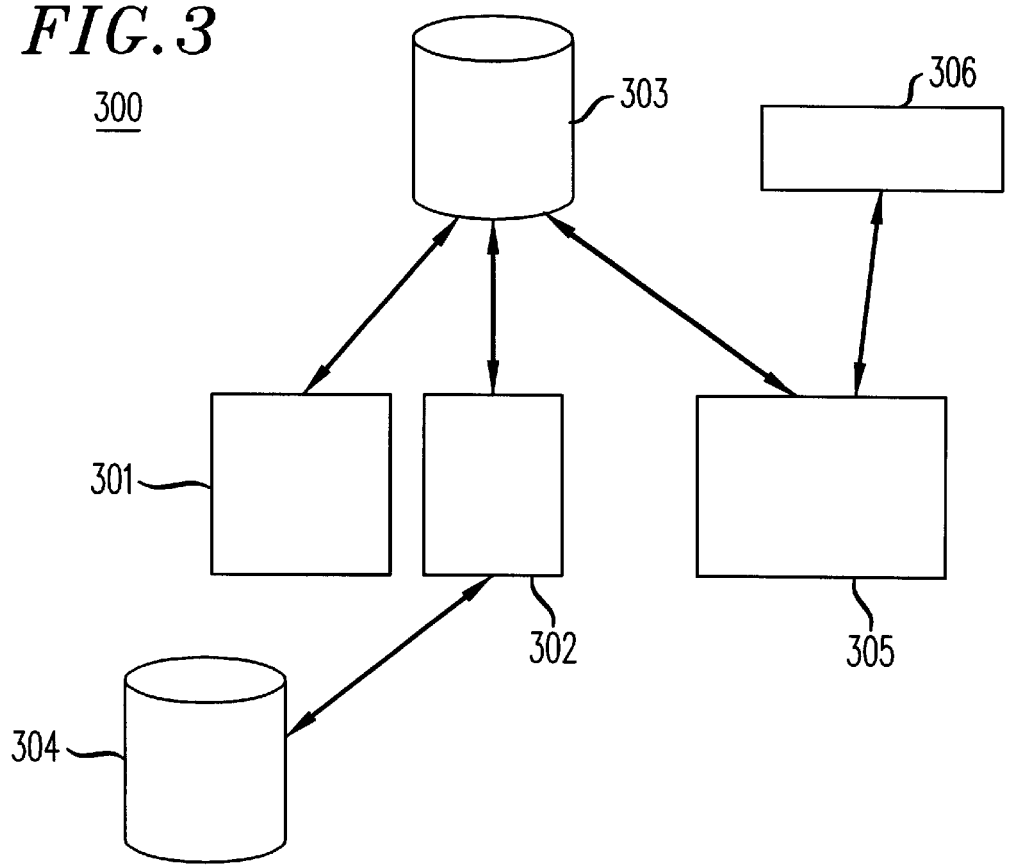
FIG. 3 shows a block diagram of components of a computer system configurable for providing the functions of either of the computers shown in FIG. 1 or 2.

Referring now to FIG. 1, there is shown an illustrative block diagram of a telecommunications infrastructure useful in describing the operation of the present invention. The telecommunications infrastructure includes a computer 101, a modem 102, a wired telecommunication network 103, a wireless telecommunication network or cellular radio system which includes a cellular site 104 and a cellular telephone terminal 105. Communications between the computer 101 and the cellular terminal 105 in this illustrative infrastructure is in a direct connect mode in which the computer 101 communicates directly with the cellular telephone terminal 105, in accordance with a first embodiment of the disclosed invention.

Various types of cellular radio systems are known in the art and have been otherwise described. One such system is described in *The Bell System Technical Journal*, Volume 58, January 1979, Number 1, and particularly in papers in this journal entitled "Advanced Mobile Phone Service: Introduction, Background and Objectives" by W. R. Young and "The Cellular Concept" by V. H. MacDonald.

The computer 101 is used to input, maintain and organize information that is sent to the cellular telephone terminal 105. A user of the computer 101 may easily employ readily available input devices, i.e., keyboard, mouse, large display terminal, and the like, at the computer. The user is also provided access to the computer's information accessing capability, available through a primary program, for entering and storing information in memory (not shown) in the computer 101. A secondary program in computer 101 utilizes a modem 102 to initiate a telephone call via the wired telecommunication network 103 using standard modem communication protocols. Personal computers and modems are readily available in the art. A personal computer suitable for use as computer 101 is the Model No. System 3333 presently available from NCR. A number of modems suitable for use as modem 102 is available from AT&T Paradyne. The cellular site 104 in the cellular radio system completes the call to the cellular telephone terminal 105 in the same manner as a standard telephone call is completed.

Prior to the initiation of the telephone call to the cellular telephone terminal 105 for transmitting the desired data to this unit, this terminal is first configured in an information or data receive mode by the user. The user is able to configure the terminal 105 through an interface which includes interface buttons 106 and cellular display 107. This interface permits the user to access a program in memory therein that configures the terminal 105 in the data receive mode. An interface suitable for use in the telephone terminal 105 is described in U.S. patent applications Ser. No. 08/559516 and Ser. No. 08/559517 which were filed on Nov. 15, 1995; these applications, along with this present application, being commonly assigned to the same assignee.

When the incoming call from the computer 101 is received, the terminal 105, while configured in the data receive mode, accepts a modem call, and using presently available modem protocols proceeds to download and store information into existing storage. In accordance with an aspect of the disclosed embodiment, such operation includes the downloading of a personal directory that is accessible in a manner identical to that in which those directories normally input manually into the cellular telephone terminal 105 are accessed. Other information such as appointments, reminders, anniversaries, by way of example, may also be input into the terminal. Such events may be accompanied by a user settable audible alarm for alerting the user at the prescribed time. Examples of how information is entered into a directory and displayed on a telephone terminal are described in U.S. Pat. Nos. 5,396,547 and 5,487,104. Examples of information that may be entered into and retrieved from a telephone terminal are illustratively described in U.S. Pat. No. 5,493,611.

Referring next to FIG. 2, there is illustratively shown a telecommunications infrastructure in which a telephone terminal is configured with data from a computer, in accordance with a second embodiment of the disclosed invention. Communications between a computer 201 and a cellular terminal 206, in this illustrative infrastructure, is in a network translator mode in which the computer 201 communicates with the cellular terminal 206 through a network translator 204 juxtaposed between the wired telecommunication network and the wireless telecommunication network.

In the network translator mode, the communications protocols used in communications between the computer, modem and over the wired telecommunication network may differ from that used between the cellular site, the cellular telephone terminal and over the wireless telecommunication network. Therefore, the use of the network translator 204 may be advantageously employed in communicating data directly in bit format to a digital cellular telephone terminal in which a communications protocol such as global systems for mobile communications (GSM), time division multiple access (TDMA) or code division multiple access (CDMA) is employed.

The computer 201 is used to input, maintain and organize information that is sent to the cellular telephone terminal 206. The computer 201 utilizes a modem 202 to initiate a telephone call via the wired telecommunication network 203 using one of standard and readily available modem communication protocols. The computer 201 connects with the network translator 204 which receives the data using the same standard telecommunications protocol used by modem 202. The network translator 204 then utilizes the cellular radio system which includes cellular site 205 to complete a data telephone call to the cellular telephone terminal 206. The network translator function provided by network translator 204 may be easily provided by either the 4ESS™ electronic switch or the 5ESS® electronic switch, both available from AT&T Corp.

Prior to the initiation of the telephone call to the cellular telephone terminal 206 for transmitting the desired data to this unit, this terminal is first configured in an information or data receive mode by the user. The user is able to reconfigure the terminal 206 through an interface which includes interface buttons 207 and display 208. This interface permits the user to access a program in the terminal 206 that configures this terminal in the data receive mode.

When the incoming call from the computer 201 is received, the terminal 206 accepts this digital call, and using a selected one of available digital protocols, proceeds to download and store the information which may comprise directories and other information into existing storage.

Referring next to FIG. 3, there is shown a block diagram of a computer system 300 configurable for providing the functions of either computer 101 or 201, in accordance with the present invention. The computer system 300 includes an existing computer organizer or computer telephone application 301, a special purpose database editor 302, a local computer database 303, a network or distance computer database 304, computer communications applications 305 and a communication modem 306 and one or more associated protocols.

The computer organizer or computer telephone application 301 is employed by a user to create and maintain database 303, a portion of which contains the desired data for a cellular telephone terminal, for example, telephone terminals 105 and 206. As an alternative, the special purpose database editor 302 may be provided to create and edit database 303. Either of these programs may have access to a larger network database 304 representing directories of numbers, such as corporate or public databases. The computer communications applications 305 is employed to identify and extract the data in database 303 and communicate it via modem 306 using one of standard communications protocols. The application 305 allows, for example, the user to enter a telephone number associated with the cellular telephone terminal, which is either contacted directly or the number transmitted to a network translator such as translator 204, shown in FIG. 2, which in turn contacts the telephone terminal.

Figure 4:
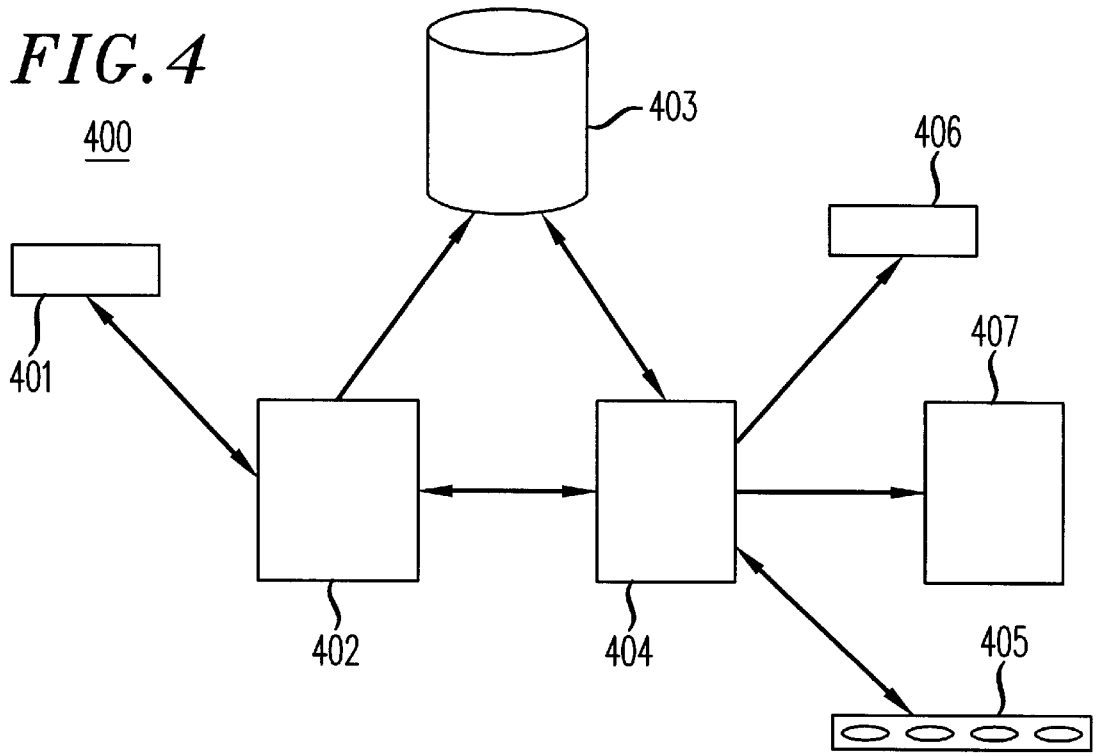
FIG. 4 shows a block diagram of components of a cellular telephone terminal configurable for providing the functions of either of the telephone terminals shown in FIG. 1 or 2.

FIG. 4 shows a block diagram of components of a cellular telephone terminal 400 configurable for providing the functions of either terminal 105 or terminal 206, in accordance with the present invention. The cellular telephone terminal 400 is augmented by the addition of either a hardware or software modem 401 for allowing the reception of digital data directly into the cellular terminal. A first modification to firmware 402 in the cellular telephone terminal is provided in order to configure the telephone terminal to accept data. A second modification which is made to the cellular terminal's feature flow firmware 404 involves changes to the code that defines a feature flow presented to the user of the telephone terminal. The modification of this code involves the addition of an "information download" mode to the telephone terminal.

This information download mode is added to an existing set of telephone modes, and requires the user to configure the telephone terminal into this special mode before any data may be added. Security and control of the download period is advantageously provided by requiring physical possession of the telephone terminal, and only allowing data download during user selected periods. Entering this special mode is accomplished in an integrated manner using both the user interface buttons 405 and display 406 of the telephone terminal. Another modification to the feature flow firmware 404 is that which allows data to be entered into the digital database 403 and then permit a user of the telephone terminal to access this data subsequently in the same manner as other data in the telephone terminal, i.e., by accessing the telephone dialer 407.

FIG. 5 is a flow diagram for illustrating an operational sequence of how information initially created in the computer system 300 is downloaded into the cellular telephone terminal 400. The functions provided by computer system 300 and terminal 400 are each provided by a process or program respectively stored in non-volatile database memory in each of these units.

The program is entered at step 501 where the user enters or modifies information to be sent to the telephone terminal from step 501, the program advances to step 502 where a computer communications program that allows selection by a user of the data to be sent is executed. In step 503, the user selects the data to be sent to the telephone terminal. After step 503, the cellular telephone terminal is configured by the user into the "information download" mode at step 507. The user next instructs the computer at step 504 to send the selected data to the cellular telephone terminal.

At step 505, the computer modem initiates the telephone call, and the cellular telephone terminal automatically answers the call and receives all data in step 508 contained in a file transmitted by the computer system. After step 508 and at the end of the file, the computer system sends an end of file indicator, and terminates the connection in step 506. The cellular telephone terminal then ends the telephone call at step 509 and configured with this new data then enters into a normal operating mode.

While the foregoing invention has been described in terms of the above detailed embodiments, it will be readily apparent to those skilled in the art that various modifications can be made. One such modification is the telecommunication infrastructure shown in FIG. 6 in which the computer 601 and the cellular telephone terminal 605 are supported by a telecommunications infrastructure which includes a land-line supported private base station 604. A private base station is a low power station over which a user can register his or her cellular radio terminal and make and receive telephone calls. A private base station shares the same frequency bands with large cellular sites, but operates at a greatly reduced power level. Also, each private base station has a land-line subscriber telephone number through which all incoming calls are routed.

The requirements for the private base station and the cellular telephone terminal are set forth in the Telecommunications Industry Association (TIA) Interim Standard (IS) 136, dated December 1994. The operation of such a base station is disclosed in copending and commonly assigned U.S. patent application Ser. Nos. 08/509403, 08/509404 and 08/509406, all filed on Jul. 31, 1995.

With specific reference now to FIG. 6, there is shown an illustrative block diagram of a telecommunications infrastructure useful in describing the operation of the present invention. The telecommunications infrastructure includes the computer 601, a modem 602, a wired telecommunication network 603, a wireless telecommunication network or cellular radio system which includes the private base station 604 and the cellular telephone terminal 605. Communications between the computer 601 and the cellular terminal 605 in this illustrative infrastructure is in a direct connect mode in which the computer 601 communicates directly with the cellular telephone terminal 605.

The computer 601 is used to input, maintain and organize information that is sent to the cellular telephone terminal 605. The computer 601 utilizes the modem 602 to initiate a telephone call via the wired telecommunication network 603 using one of standard modem communication protocols. The private base station 604 in the cellular radio system completes the call to the cellular telephone terminal 605 in the same manner as a standard telephone call is completed.

Security and ease of use are enhanced as well as telephone call charges are minimized through use of the telecommunication infrastructure shown in FIG. 6. Since the user registers his or her telephone terminal with the private base station, all cellular calls directed to the telephone terminal during periods of registration with the base station do not use the cellular radio system in which cellular sites 104 and 205, for example, are employed. Rather, these calls will go via a subscriber line connected to the wired telecommunication network 603 directly to the private base station 604. And the private base station provides a low-level signal that is received by the terminal only while the terminal 605 is within close proximity to the base station 604. In operation, therefore, a user at computer 601 configures this computer, and thus modem 602, to make a telephone call on a first subscriber line. The telephone call returns to the private base station on a second subscriber line and the base station is then used by the computer 601 in transferring the information contained in the computer 601 to the telephone terminal 605.

Prior to the initiation of the telephone call to the telephone terminal 605 for transmitting the desired data to this unit, this terminal is first configured in an information or data receive mode by the user. The user is able to configure the terminal 605 in the data receive mode through use of an interface which includes interface buttons 606 and cellular display 607.

When the incoming call from the computer 601 is received, the terminal 605, while configured in the data receive mode, accepts a modem call, and proceeds to download and store information into existing storage in the telephone terminal 605.

Yet another modification of the invention is to arrange the private base station so that it communicates directly with the computer without the need for accessing the wired telecommunication network, illustratively shown as network 603 in FIG. 6. An RS-232 interface, for example, may be incorporated into a private base station to interface with an RS-232 interface also available on the computer. In such a modification, the computer interfaces directly with the private base station and the information data for the cellular telephone terminal is provided directly to the base station. In the operation of this modification of the invention, the need to use one or more subscriber lines in communicating with the personal base station is avoided altogether. It is therefore to be understood that within the scope of the appended claims, the invention may be practiced otherwise than as specifically described.

I claim:

1. An arrangement for remotely programming a portable information storage and retrieval device having a small display and a reduced size keypad which is operational to wirelessly communicate in a cellular telephone system, the arrangement comprising:

a personal computer for organizing and storing digital information for transmission to the device;

communication means for establishing a communication path between the personal computer and the device, said communication path including a portion comprising a wireless communication path in said cellular telephone system;

configuring means in the device for placing said device in a receive mode for receiving said digital information from the personal computer over said wireless communication path; and a modem in the device for receiving said digital information when said device is configured by said configuring means to receive said digital information.

2. The arrangement of claim 1 wherein said information includes a personalized directory of telephone numbers.

3. The arrangement of claim 2 wherein said personalized directory includes a name associated with each of said telephone numbers.

4. The arrangement of claim 1 wherein said communication means includes a wired telecommunication network and a wireless telecommunication network.

5. The arrangement of claim 4 wherein said communication means further includes a network translator juxtaposed between said wired telecommunication network and said wireless telecommunication network.

6. The arrangement of claim 5 wherein said telephone terminal is a digital cellular telephone terminal.

7. The arrangement of claim 6 wherein said network translator communicates said information to said digital telephone terminal in a digital bit format.

8. The arrangement of claim 1 wherein said communication means includes a wired telecommunication network and a wireless telecommunication network, said wired telecommunication network including a private base station.

9. The arrangement of claim 1 wherein said information includes a personalized directory of appointments.

10. The arrangement of claim 9 including means for providing an audible alerting signal at a predetermined time, said predetermined time being associated with a particular one of the appointments within the personalized directory of appointments.

11. A method of remotely programming a portable information storage and retrieval device having a small display and a reduced size keypad, said device operating to wirelessly communicate in a cellular telephone system, the method comprising the steps of:

organizing and storing in a personal computer digital information for transmission to the device;

establishing a communication path between the personal computer and the device, said communication path including a portion comprising a wireless communication path in said cellular telephone system;

configuring the device for receiving said digital information from the personal computer over said wireless communication path; and receiving said digital information utilizing a modem in the device when said device is configured to receive said digital information.

12. The method of claim 11 wherein said information includes a personalized directory of telephone numbers.

13. The method of claim 12 wherein said personalized directory includes a name associated with each of said telephone numbers.

14. The method of claim 11 wherein said communication path establishing step includes the step of providing both a wired telecommunication network and a wireless telecommunication network.

15. The method of claim 14 wherein said communications path establishing step further includes the step of juxtaposing a network translator between said wired telecommunication network and said wireless telecommunication network.

16. The method of claim 15 wherein said telephone terminal is a digital cellular telephone terminal.

17. The method of claim 16 wherein said network translator communicates said information to said digital telephone terminal in a digital bit format.

18. The method of claim 11 wherein said communication path establishing step includes the step of providing both a wired telecommunication network and a wireless telecommunication network, said wired telecommunication network including a private base station.

19. An arrangement for remotely programming a portable information storage and retrieval device which is operational to wirelessly communicate in a cellular telephone system, the arrangement comprising:

a personal computer for organizing and storing digital information for wireless transmission to the device;

communication means for establishing a communication path between the personal computer and the device, said communication path including a portion comprising a wireless communication path in the cellular telephone system, said communication means including a private base station for establishing a low-level radio frequency signal communication path as the wireless communication path between said base station and said device;

configuring means in the device for configuring said device for receiving said digital information from the personal computer over said wireless communication path; and a modem in the device for receiving said digital information when said device is configured by said configuring means to receive said digital information.

20. The arrangement of claim 19 wherein said communication means further includes means for connecting said personal computer and said private base station for providing a wired telecommunication network.

21. A remotely programmable portable information storage and retrieval device operational to wirelessly communicate both voice signals and digital data over a common channel in a telephone network, said device comprising:

a portable body having a small size display and a reduced size keypad having user interface buttons;

a digital modem for directly receiving digital data;

firmware configured to support both a data receive mode for wirelessly receiving digital data and a mode for wirelessly receiving a voice signal over the common channel; and an interface connected to one or more of the user interface buttons to configure the device in the data receive mode for remote programming.

22. The remotely programmable portable device of claim 21 wherein in response to the detection of activation of one or more interface buttons the firmware causes the device to enter the data receive mode.

23. The remotely programmable portable device of claim 22 wherein the firmware is further operable to cause the device to automatically answer a call received when the device is in the data receive mode, to receive digital data, and to store the received digital data in the memory.

24. The remotely programmable portable device of claim 23 wherein the firmware is further operable to recognize an end of file indicator received at the end of a received digital data file and to cause the device to automatically end the call.

25. The remotely programmable portable device of claim 21 wherein the device is user programmable to allow data download only during user selected periods of time.

26. An arrangement for remotely programming a portable information storage and retrieval device having a small display and a reduced size keypad and synchronizing digital data stored in the device with data stored remotely, the device being operational to wirelessly communicate both voice signals and digital data over a common channel in a telephone system, the arrangement comprising:

a computer for organizing and storing digital data in a database for transmission to the device;

a database editor for synchronizing data stored in the device with the digital data stored in the database;

communication means for establishing a wireless communications path between the computer and the device;

configuring means in the device for configuring said device for wirelessly receiving said digital data from the computer over said communication path; and a modem in the device for receiving said digital data when said device is configured by said configuring means to receive said digital data.

27. The arrangement of claim 26 wherein the remotely programmable portable device further comprises a digital modem for directly receiving said digital data.

28. The arrangement of claim 26 wherein said digital data comprises a personalized directory of telephone numbers and associated names.

29. An arrangement for remotely programming a portable information storage and retrieval device having a small display and a reduced size keypad which is operational to wirelessly communicate in a cellular telephone system, the arrangement comprising:

a personal computer for organizing and storing digital information for transmission to the device, the personal computer having an associated modem for outputting a modulated signal;

communication means for establishing a data communication path between the personal computer and the device, said data communication path including a portion comprising a wireless communication path in said cellular telephone system;

configuring means in the portable information storage and retrieval device for placing said device in a receive data mode for receiving said digital information from the personal computer over said wireless communication path; and a modem in the portable information storage and retrieval device for receiving said digital information carried on the modulated signal along the data communication path when said device is configured by said configuring means to receive said digital information.

30. The arrangement of claim 29 wherein the configuring means further comprises a software component in the device operable for securing the device from interruption during the downloading of said digital information.

31. The arrangement of claim 29 wherein the modem receives the digital information in file format.

* * * * *